(12) United States Patent
Isobe et al.

(10) Patent No.: US 11,707,709 B2
(45) Date of Patent: Jul. 25, 2023

(54) HOLLOW FIBER MEMBRANE CONTACTOR SCRUBBER/STRIPPER FOR CABIN CARBON DIOXIDE AND HUMIDITY CONTROL

(71) Applicant: HONEYWELL INTERNATIONAL INC., Charlotte, NC (US)

(72) Inventors: Jun Isobe, Torrance, CA (US); Stephen Yates, South Barrington, IL (US); Phoebe Henson, Scottsdale, AZ (US); Ted Bonk, Cave Creek, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 56 days.

(21) Appl. No.: 17/465,360

(22) Filed: Sep. 2, 2021

(65) Prior Publication Data
US 2021/0394112 A1    Dec. 23, 2021

Related U.S. Application Data

(62) Division of application No. 15/896,150, filed on Feb. 14, 2018, now Pat. No. 11,123,685.

(Continued)

(51) Int. Cl.
*B01D 53/22* (2006.01)
*B01D 53/18* (2006.01)
(Continued)

(52) U.S. Cl.
CPC .......... *B01D 53/18* (2013.01); *B01D 53/1425* (2013.01); *B01D 53/1475* (2013.01);
(Continued)

(58) Field of Classification Search
CPC .......... B01D 53/1493; B01D 2053/224; B01D 2252/30; B01D 69/081; B01D 2257/504;
(Continued)

(56) References Cited

U.S. PATENT DOCUMENTS 2,021,690 A   11/1935   Kaumnan
2,035,478 A   3/1936    Houdry
(Continued)

FOREIGN PATENT DOCUMENTS

| EP | 0374873 A2 | 6/1990 |
| PL | 217130 B1 | 6/2010 |
| WO | 2014170858 A1 | 10/2014 |

OTHER PUBLICATIONS

Wang et al., "Modeling of CO2 Stripping in a Hollow Fiber Membrane Contactor for CO2 Capture", American Chemical Society Publications, Energy Fuels, Oct. 1, 2013, 6887-6898.

(Continued)

*Primary Examiner* — Anthony R Shumate
(74) *Attorney, Agent, or Firm* — Lorenz & Kopf LLP (57) ABSTRACT

An environmental control system includes an air conditioning subsystem and a contaminant removal subsystem downstream of the environment to be conditioned. The contaminant removal subsystem includes: a first gas-liquid contactor-separator; a second gas-liquid contactor-separator; and a dehumidifier disposed either upstream of the first gas-liquid contactor-separator or downstream of the second gas-liquid contactor-separator.

16 Claims, 10 Drawing Sheets

Related U.S. Application Data (60) Provisional application No. 62/463,921, filed on Feb. 27, 2017.

(51) Int. Cl.

| | | |
|---|---|---|
| *B01D 53/14* | (2006.01) | |
| *B01D 53/30* | (2006.01) | |
| *B01D 53/26* | (2006.01) | |
| *B64D 13/06* | (2006.01) | |
| *B01D 63/02* | (2006.01) | |
| *B01D 69/08* | (2006.01) | |
| *B64G 1/48* | (2006.01) | |
| *F24F 3/14* | (2006.01) | |

(52) U.S. Cl.
CPC ....... *B01D 53/1493* (2013.01); *B01D 53/268* (2013.01); *B01D 53/30* (2013.01); *B01D 63/02* (2013.01); *B01D 69/081* (2013.01); *B64D 13/06* (2013.01); *B64G 1/48* (2013.01); *F24F 3/14* (2013.01); *B01D 2053/224* (2013.01); *B01D 2252/30* (2013.01); *B01D 2257/504* (2013.01); *B01D 2258/06* (2013.01); *B01D 2259/4575* (2013.01); *B01D 2325/38* (2013.01); *B64D 2013/0637* (2013.01); *B64D 2013/0662* (2013.01); *F24F 2003/144* (2013.01); *Y02C 20/40* (2020.08)

(58) Field of Classification Search
CPC ................ B01D 53/1475; B01D 53/18; B01D 53/1425; B01D 53/30; B01D 2258/06; B01D 63/02; B01D 2325/38; B01D 2259/4575; B01D 53/268; B64D 2013/0662; B64D 2013/0637; B64D 13/06; F24F 3/14; F24F 2003/144; Y02C 20/40; B64G 1/48
See application file for complete search history.

(56) References Cited

U.S. PATENT DOCUMENTS

| | | | |
|---|---|---|---|
| 2,412,110 A | 12/1946 | Williams | |
| 2,450,707 A | 10/1948 | Zwickl | |
| 2,466,779 A | 4/1949 | Paul | |
| 3,102,399 A | 9/1963 | Gershon | |
| 3,277,954 A | 10/1966 | Gershon | |
| 3,435,592 A | 4/1969 | Lindenmaier | |
| 4,208,199 A | 6/1980 | Nakazato | |
| 4,347,705 A | 9/1982 | Mirante | |
| 4,414,191 A | 11/1983 | Fuderer | |
| 4,846,977 A * | 7/1989 | DeVellis | B01D 63/022 210/651 |
| 4,861,351 A | 8/1989 | Nicholas et al. | |
| 5,096,470 A | 3/1992 | Krishnamurthy | |
| 5,254,143 A | 10/1993 | Anazawa et al. | |
| 5,281,254 A | 1/1994 | Birbara et al. | |
| 5,641,337 A * | 6/1997 | Arrowsmith | B01D 53/268 95/52 |
| 5,997,594 A | 12/1999 | Edlund et al. | |
| 6,165,253 A | 12/2000 | Sirkar et al. | |
| 6,228,145 B1 | 5/2001 | Falk-Pedersen et al. | |
| 6,616,841 B2 | 9/2003 | Cho et al. | |
| 8,317,906 B2 | 11/2012 | Bansal | |
| 8,518,156 B2 | 8/2013 | Kozak et al. | |
| 8,722,003 B1 | 5/2014 | Avagliano et al. | |
| 9,289,717 B2 | 3/2016 | Peake et al. | |
| 9,333,458 B2 | 5/2016 | Cao | |
| 9,623,369 B2 | 4/2017 | Bikson et al. | |
| 10,688,435 B2 | 6/2020 | Henson | |
| 2002/0083829 A1 | 7/2002 | Edlund et al. | |
| 2003/0056652 A1 | 3/2003 | Edlund et al. | |
| 2004/0194483 A1* | 10/2004 | Hoyt | B01D 53/22 62/176.6 |
| 2004/0265199 A1 | 12/2004 | MacKnight | |
| 2005/0132883 A1 | 6/2005 | Su | |
| 2007/0051238 A1 | 3/2007 | Jain et al. | |
| 2008/0087167 A1* | 4/2008 | Wright | B01D 53/268 55/385.3 |
| 2008/0087168 A1* | 4/2008 | Wright | B01D 63/02 96/108 |
| 2008/0257154 A1* | 10/2008 | Wright | B01D 53/22 96/4 |
| 2008/0263892 A1* | 10/2008 | Nichols | B01D 53/268 34/79 |
| 2008/0276803 A1 | 11/2008 | Molaison | |
| 2009/0007787 A1* | 1/2009 | Wright | B60T 17/004 55/318 |
| 2010/0089239 A1* | 4/2010 | Wright | B01D 53/268 96/6 |
| 2010/0313758 A1 | 12/2010 | Stevens | |
| 2012/0014851 A1 | 1/2012 | Kloosterman et al. | |
| 2012/0247327 A1 | 10/2012 | Omole | |
| 2012/0285320 A1 | 11/2012 | Heald et al. | |
| 2014/0090556 A1 | 4/2014 | Shah et al. | |
| 2014/0336428 A1 | 11/2014 | Banerjee | |
| 2016/0206993 A1 | 7/2016 | Deng | |
| 2017/0107162 A1 | 4/2017 | Duggal et al. | |
| 2017/0157855 A1* | 6/2017 | Larson | B29C 64/336 |
| 2018/0169561 A1 | 6/2018 | Jonnavittula et al. | |
| 2018/0243682 A1* | 8/2018 | Isobe | B01D 53/1425 |
| 2018/0265993 A1 | 9/2018 | Kamire | |
| 2021/0061475 A1* | 3/2021 | Kamire | B01D 53/1412 |
| 2021/0299606 A1* | 9/2021 | Henson | B01D 53/1412 |

OTHER PUBLICATIONS

Gomez-Coma et al., "Mass Transfer Analysis of CO2 Capture by PVDF Membrane Contactor and Ionic Liquid", Chemical Engineering & Technology, 2017, 40, No. 4, 1-14.

Dai et al., "Precombustion CO2 Capture in Polymeric Hollow Fiber Membrane Contactors Using Ionic Liquids: Porous Membrane versus Nonporous Composite Membrane", American Chmical Society Puclications, Industrial & Engineering Chemistry Research, May 2, 2016, 5983-5992.

\* cited by examiner

HOLLOW FIBER MEMBRANE CONTACTOR SCRUBBER/STRIPPER FOR CABIN CARBON DIOXIDE AND HUMIDITY CONTROL

CROSS-REFERENCE TO RELATED APPLICATIONS

This application claims the benefit of U.S. provisional application No. 62/463,921, filed Feb. 27, 2017, and is a divisional of U.S. application Ser. No. 15/896,150, filed Feb. 14, 2018.

BACKGROUND OF THE INVENTION

The present invention generally relates to contaminant removal and, more particularly, to apparatus and methods of contaminant removal employing gas-liquid contact and separation.

It is of great interest to control and limit the concentration of carbon dioxide ($CO_2$) in occupied spaces, including homes, buildings, transportation vehicles, aircraft and spacecraft. It is particularly important to control $CO_2$ concentrations in enclosed vehicles like aircraft or spacecraft. In aircraft, fresh air enters the occupied space as bleed air from the engine, and results in increased fuel consumption. Decreasing the bleed air flow would improve fuel efficiency, but would require a technology to remove $CO_2$ from the air. The Federal Aviation Administration (FAA) of the United States limits the acceptable concentration of $CO_2$ to 5000 ppm, while aircraft typically have 1500-2300 ppm. In spacecraft, no fresh air is available, and the cabin air must be preserved in a healthful condition.

Crews of the International Space Station (ISS), with elevated $CO_2$ levels just under 4 mmHg (5300 ppm) have reported symptoms such as early fatigue onset, impaired function and decision-making, and headaches. Law J, Alexander D (2016). CO2 on the International Space Station: An Operations Update. Annual AsMA Meeting; 24-28 Apr. 2016; Atlantic City, N.J., USA; https://ntrs.nasa.gov/archive/nasa/casi.ntrs.nasa.gov/20150019624.pdf. Long duration, deep space missions lengthen crew exposure to these conditions. NASA is requiring future spacecraft to maintain $CO_2$ partial pressures in the vessel atmosphere below 2 torr (2600 ppm) to preserve crew health, and maintain alertness and comfort. Therefore, more advanced $CO_2$ removal systems are required for next generation deep space vehicles in order to maintain a much lower $CO_2$ partial pressure. In addition, deep space vehicles are required to have a lower size, weight, power, and thermal load, and use fewer consumables, while fixing existing safety problems that are apparent in current systems. The maintenance interval of current systems (three to six months) is also required to jump to three years.

$CO_2$ recovery and recycling is a critical component of the air revitalization system for long duration missions. Presently on ISS, the carbon cycle, or carbon loop, is not closed and $CO_2$ is either discarded to space or processed through a Sabatier reactor to recover water; methane produced by the Sabatier reactor is discarded to space. Longer duration missions will require a more closed carbon loop to minimize carrying disposable resources in the vessel—such as water, hydrogen, oxygen, etc.—that might otherwise be replenished from recycling $CO_2$. In other words, any discarded carbon dioxide increases in the amount of oxygen or water required to be brought with the mission.

For applications in spacecraft or aircraft, the size and weight of the overall system must be minimized. Great emphasis must be placed on minimizing the size, weight and number of scrubber or stripper modules. It is well known that stripper modules can be made to be more efficient if a sweep gas is used to flush the permeate out of the module, and that this can minimize the size, weight and number of such modules. But the source of this sweep gas is also important, since if it is foreign to the process then a supply of this gas must be provided.

Such a closed-loop $CO_2$ recovery system should be capable of throttling its process when process demand is lower in order to reduce energy consumption. For missions to Mars, some plans include landing on the planet and remaining there for eighteen months, during which the Mars Transfer Habitat remains in Mars orbit, unoccupied. The life support system would remain in an operationally ready state during this period able to resume operation with high reliability for the return flight quickly.

In the past, solid adsorbents have been used for $CO_2$ removal. However, liquid absorbents have significant advantages over solid adsorbents. The ability to pump the absorbent from scrubber to stripper stages allows for continuous absorption and regeneration of the sorbent, which is generally more stable and reliable than alternating adsorbent beds between absorption and regeneration, and eliminates the need for a complicated valve network. Liquid may also be easily replenished or exchanged without disassembly.

Existing state-of-the-art $CO_2$ removal systems include the Carbon Dioxide Removal Assembly (CDRA) aboard the ISS, which relies on solid zeolite adsorbents that experience a particulate dusting problem and is higher in size, weight and power when compared to estimates of a liquid system. Other $CO_2$ removal systems include amine-based systems like those used on submarines. These amines are prone to outgassing of dangerous and odorous products, air oxidation, thermal degradation, and can be corrosive.

As can be seen, there is a need for improved apparatus and methods to remove contaminants from a supply air in environments such as deep space vehicles.

SUMMARY OF THE INVENTION

In one aspect of the present invention, an environmental control system comprises an air conditioning subsystem; a contaminant removal subsystem downstream of the environment to be conditioned; wherein the contaminant removal subsystem includes: a first gas-liquid contactor-separator; a second gas-liquid contactor-separator; and a dehumidifier disposed either upstream of the first gas-liquid contactor-separator or downstream of the second gas-liquid contactor-separator.

In a further aspect of the present invention, a contaminant removal subsystem comprises a first gas-liquid contactor-separator; a second gas-liquid contactor-separator downstream of the first gas-liquid contactor-separator; and a dehumidifier disposed either upstream of the first gas-liquid contactor-separator or downstream of the second gas-liquid contactor-separator.

In another aspect of the present invention, a contaminant removal subsystem comprises a first gas-liquid contactor-separator; a second gas-liquid contactor-separator downstream of the first gas-liquid contactor-separator; and a condenser downstream of the second gas-liquid contactor-separator; wherein the condenser is configured to: discharge liquid water for recovery and reuse; discharge a gaseous contaminant for recovery and reuse.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention can be integrated into environments such as spacecraft used in long-duration missions, specifically, space stations and spacecraft and habitats used in and beyond low earth orbit, as the invention, particularly gas-liquid separation, operates independent of gravity. The present invention may also be used for aircraft or submarines, as examples, where its gravity independence would help mitigate failures due to managing liquids under turbulence or placing the vehicle in an inverted position.

The present invention may be part of an environmental control system. The present invention can provide a contaminant (e.g., $CO_2$) removal subsystem that may interface with an upstream temperature and humidity control device which interfaces with an environment for occupants, such as a cabin. Downstream of this removal subsystem, water may be stored for water processing, whereas a contaminant outlet may interface with a contaminant reduction subsystem. It will be understood by those skilled in the art that incorporation of a contaminant removal subsystem into an integrated environmental control system will be desirable in some applications, including aircraft cabins, but for other applications, the subsystem may be operated as an independent unit, or integrated with other subsystems which convert carbon dioxide into oxygen and other byproducts.

Air that will be processed using the system described in this patent may come from occupied environments, and may contain substantial humidity. It is an important object of this invention that it removes carbon dioxide from air containing humidity and produces a carbon dioxide product stream that is substantially free of contaminating water. In the event that the process is intended to provide carbon dioxide to a downstream Sabatier reactor, this reactor can tolerate a water concentration in the carbon dioxide no greater than 2%. It is therefore an object of the invention to provide carbon dioxide that meets this purity requirement.

This invention generally provides a metabolic $CO_2$ removal system for spacecraft which can include a continuous, liquid-based architecture having paired scrubbing and stripping hollow fiber membrane gas-liquid contactors between which the ionic liquid absorbent is pumped. The high surface area of the hollow fiber membrane contactors enables a high mass transfer of $CO_2$, humidity, and contaminant gases into the ionic liquid using a small system volume and weight. The membrane contactor can ensure that liquid and gas do not need further separation, enabling the device to act in a gravity-independent way without the use of moving parts.

This invention can flow the liquid absorbent counter-current through hollow-fiber membranes to achieve the required mass transfer without the need of a powered spray system and coalescer. It can also allow contact between the liquid absorbent and gaseous contaminants, without the mixing of the liquid and air, which in other contactors would result in the need for centrifugal separator machinery to separate the phases. Not mixing the air and liquid can also decrease the risk of contamination of absorbent into the cabin.

The same membrane-based device can be used as a stripper component to eliminate the need for a spray scrubber contactor. Whereas a spray stripper might experience ionic liquid buildup due to the lack of gravity and lack of large movement of fluid through the chamber, a membrane contactor stripper can allow for easy fluid flow without the need to generate centrifugal forces.

In an exemplary embodiment, the invention is in a regenerable cabin air CO2 and water control system of a full regenerable air-revitalization system for spacecraft and distant habitats with long duration missions. Upstream of the CO2 removal device in this regenerable air revitalization system might be a temperature and humidity control device. Downstream of the CO2 removal device might be a device which processes the captured CO2 into water (and methane as a byproduct), or converts it directly into oxygen (and carbon or carbon monoxide as a byproduct).

A membrane contactor could comprise a cylindrical module filled with parallel hollow porous fibers. Dimensions of these hollow fibers could be <3 mm, and the pore dimension could be <2 microns. Optionally, baffles or other structures may also be present between the fibers or between the fibers and the outer shell to improve mixing of the fluid on the shell side. Also optionally, flow on the shell side may be swirled or turbulated using duct bends prior to entry into the membrane module and/or angling flow entry vector into the module and/or using guide vanes or similar structures to enhance mass transfer across the membrane. Ports on the two ends of the modules may connect to a manifold (typically called a tube sheet) allowing fluid flow from the ports through the bore of each fiber and hence to the opposing port. Two additional ports may access the shell-side at opposite ends of the module, allowing fluid flow on the outside of the fibers through the module. The material of the hollow fibers can be selected such that the ionic liquid does not wet the pores, and the trans-membrane pressure is kept low enough to prevent pore penetration. Possible choices for the fiber material include hydrophobic materials such as polypropylene, polyvinylidene fluoride, polysulfone, polyimide and polytetrafluoroethylene. Optionally, a coating can be applied either of PTFE or a crosslinked siloxane, to prevent liquid flow through the pores. The ionic liquid flow can be either on the "tube" side or the "shell" side. Air is flowed on the other side.

In operation as a scrubber, clean ionic liquid could be flowed on one side of the membrane, and air containing CO2 on the opposite side. Since the membrane is hydrophobic, vapor, including CO2 and water, could be allowed to cross the membrane fibers and be absorbed by the ionic liquid, and carried away to a reservoir, while the ionic liquid cannot pass through the membrane fibers, and are thus contained from the airstream.

In operation as a stripper, loaded ionic liquid could be flowed on one side of the membrane, and a small flow of sweep gas on the opposite side. The temperature of the liquid could be raised and the partial pressure of CO2 and water on the gas phase side could be decreased to create a driving force for CO2 and water to transfer. One way to accomplish this would be to apply a vacuum on the gas side. The stripper may also take advantage of any differences in desorption temperature or pressure between CO2 and water to separate the two constituents without an additional separator device.

US patent application entitled "Apparatus and Methods for Enhancing Gas-Liquid Contact/Separation" filed Feb. 1, 2017, Ser. No. 15/422,170; US patent application entitled "Ionic Liquid CO2 Scrubber for Spacecraft" filed 02-01-2017, Ser. No. 15/422,166; and US patent application entitled "Dual Stripper with Water Sweep Gas" filed concurrently herewith, are incorporated herein by reference as though fully set forth herein.

Herein, the term "absorbent" is intended to generally include absorbents and/or adsorbents.

Figure 1:
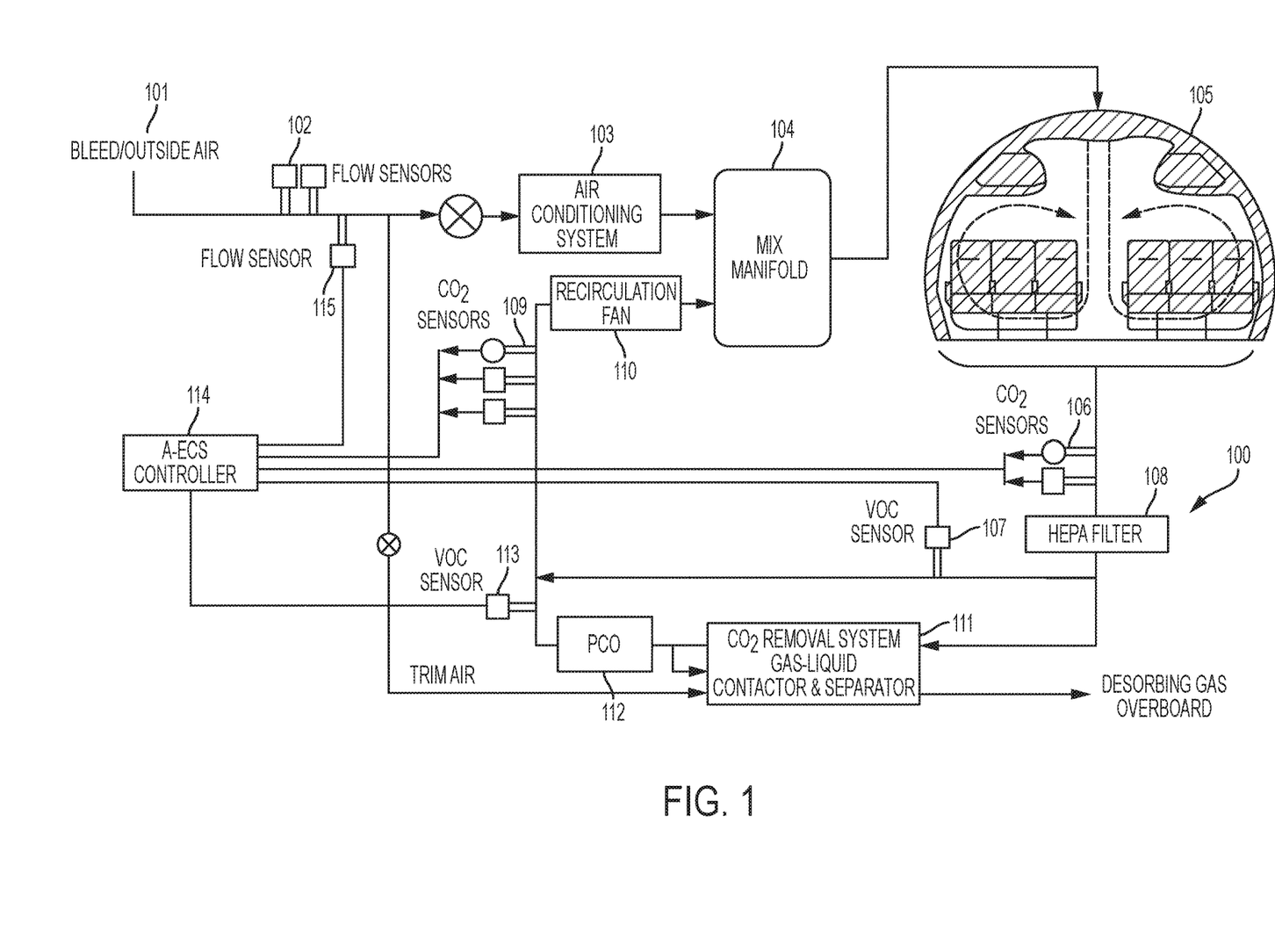
FIG. 1 is a schematic diagram of an environmental control system according to an embodiment of the present invention.

FIG. 1 is a schematic diagram of an exemplary embodiment of an environmental control system (ECS) 100 according to the present invention. The ECS 100 may receive an outside air 101 which, for example, may be a bleed air when the ECS 100 is implemented for an aircraft. The outside air 101 may flow to one or more sensors 102 that may sense characteristics of the outside air 101, such as temperature and/or humidity.

From the one or more sensors 102, the outside air 101 may flow to one or more sensors 115 that may sense characteristics of the air 101 such as temperature, pressure and/or humidity. Once past the sensor(s) 115, the outside air 101 may be conditioned by an air conditioning subsystem 103, which conditioning may include temperature, pressure and/or humidity.

Conditioned air may flow from the air conditioning subsystem 103, through a mix manifold 104, and into an environment 105 to be conditioned. The environment 105 may be an enclosed area for occupants, such as a cabin of an aircraft. In the environment 105, the conditioned air may acquire contaminants, such as from occupants in the environment 105, and produce a contaminated air.

Upon exiting the environment 105, the contaminated air may be sensed by one or more gas contaminant sensors 106. The sensor(s) 106 may sense one or more gas contaminants, such as CO2. Once past the sensor(s) 106, the contaminated air may be filtered by a filter 108. A part of filtered air from the filter 108 may then be sensed by one or more VOC sensor(s) 107 that may sense one or more volatile organic compounds (VOCs). After the sensor(s) 107, the part of a filtered air from the filter 108 may move into a recirculation fan 110. From the recirculation fan 110, the filtered air may be forced into the mix manifold 104 where the filtered air can be mixed with the conditioned air from the air conditioning subsystem 103.

Instead of and/or in addition to the filtered air moving through the fan 110, a part of filtered air from the filter 108 may move through a contaminant removal subsystem 111. The removal subsystem 111 may remove one or more gas contaminants sensed by the one or more sensors 106. The contaminant removal subsystem 111 may, in various embodiments, include one or more gas-liquid contactor and separators, such as those described below, to effectuate removal of gas contaminants. However, the present invention envisions that gas-liquid contactor and separators, other than those described below, can be employed.

Within the contaminant removal subsystem 111, a used liquid absorbent may be produced. "Used liquid absorbent" means "clean liquid absorbent" that has absorbed gas contaminant(s). "Clean liquid absorbent" means liquid absorbent that is substantially free of absorbed gas contaminant(s).

Also within the contaminant removal subsystem 111, a regenerated liquid absorbent may be produced. "Regenerated liquid absorbent" means used liquid absorbent that has undergone desorption of gas contaminant(s).

Additionally within the contaminant removal subsystem 111, a cleaned air may be produced. "Cleaned air" means air that has an insubstantial amount of gas contaminant(s) and/or H2O. In embodiments, "cleaned air" has a gas contaminant(s) and/or H2O concentration less than that of the outside air 101 and/or less than that of the contaminated air from the environment 105.

Cleaned air from the subsystem 111 may flow into a photocatalytic oxidizer (PCO) 112 to remove one or more VOCs and thereby produce a further cleaned air. One or more VOC sensors 113 may be downstream of the PCO 112. One or more gas contaminant sensors 109, such as CO2 sensor(s), can be downstream of the VOC sensor(s) 113. The further cleaned air flow can then flow into the fan 110, and then into a mix manifold 104 where it can be mixed with conditioned air from the air conditioning subsystem 103.

Instead of and/or in addition to flowing through the PCO 112, a part of cleaned air (e.g., <10%) from the contaminant removal subsystem 111 may recirculate back into the subsystem 111 for additional processing such as desorption of gas contaminant(s) from used liquid absorbent, and regeneration of clean liquid absorbent, as further described below.

A controller 114 may be in communication with one or more of the sensors 106, 109, 113, 115 for control over one or more components of the ECS 100, such as fan(s) and/or and valve(s) (not all of which may be shown in FIG. 1).

Figure 2:
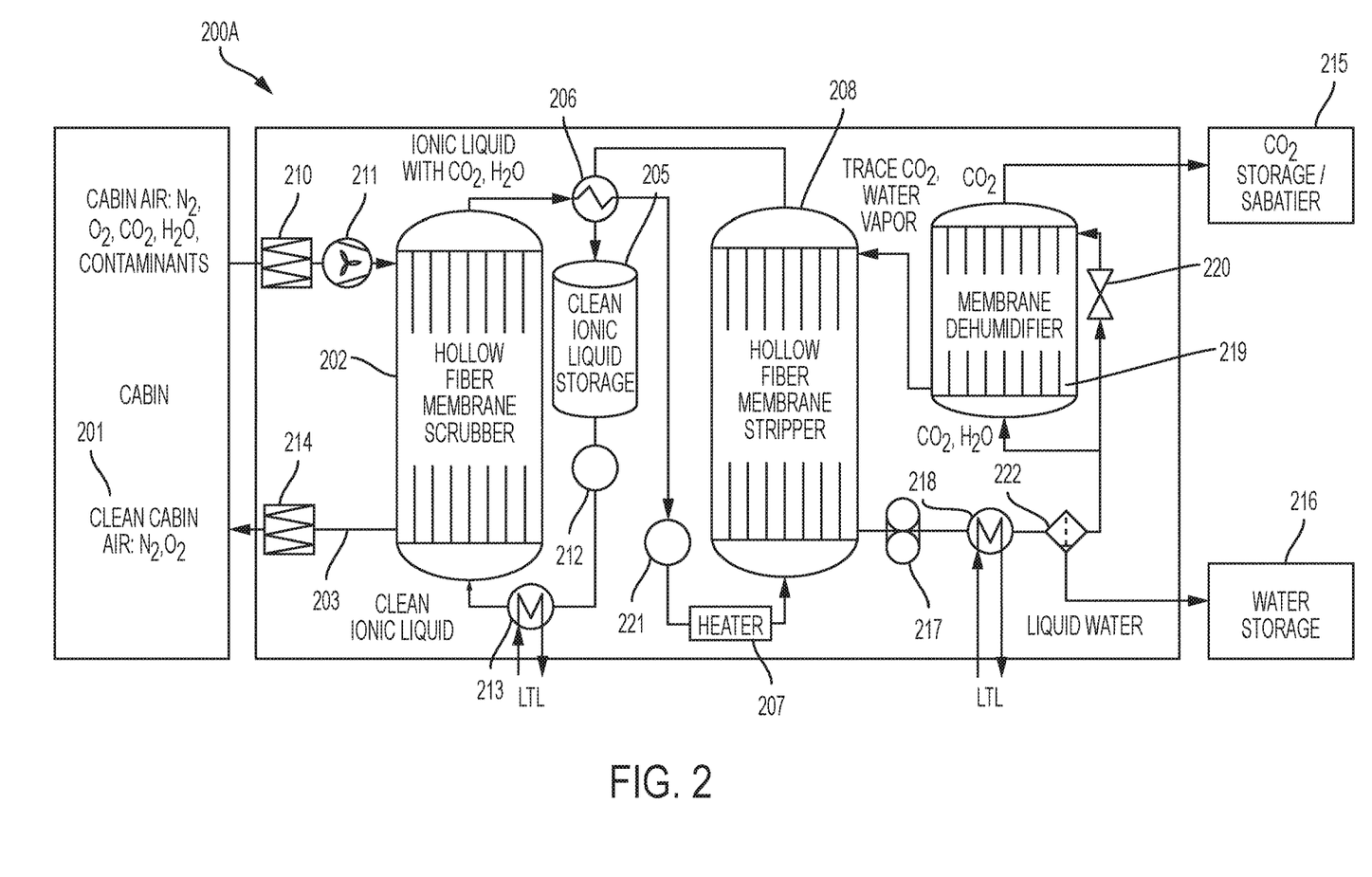
FIG. 2 is a schematic diagram of a contaminant removal subsystem according to an embodiment of the present invention.

FIG. 2 is a schematic diagram of an exemplary contaminant removal subsystem (i.e., closed-loop air revitalization subsystem) 200A that may be employed in the aircraft ECS 100 above and/or in a space-based system. However, other contaminant removal subsystems may be employed. A "closed-loop air revitalization subsystem" is intended to mean a subsystem which recovers valuable resources from waste products, such as recovering valuable oxygen from waste carbon dioxide. The subsystem 200A may include one or more gas-liquid contactor-separators to effectuate removal of gas contaminant(s), such as those described below. However, the subsystem 200A is not limited to the contactor-separators described below.

The contaminant removal subsystem 200 may receive a contaminated air 201 from an environment, such as a spacecraft cabin. The contaminated air 201 may include one or more gas contaminants such as CO2, and/or H2O, and the air 201 may flow into a first gas-liquid contactor-separator (i.e., scrubber) 202. In embodiments, the contaminated air 201 may, before entering the scrubber 202, be filtered for dust and particulates, via a filter 210, as well as being forced, via a fan 211, into the scrubber 202.

Concurrent with, or sequentially with, the scrubber 202 receiving the contaminated air 201, a clean liquid absorbent may be pumped, via a pump 212, into the scrubber 202, from a clean liquid absorbent storage 205. In embodiments, the liquid absorbent may be one or more ionic liquids described below.

Before entering the scrubber 202, the clean liquid absorbent may be cooled by a cooler 213 disposed between the pump 212 and the scrubber 202.

From the scrubber-separator 202 cleaned air 203 may optionally flow through a filter 214, to capture any leaked ionic liquid and/or produce a further cleaned air that can flow back to the environment to be conditioned. In embodiments, the cleaned air 203 may have a gas contaminant(s) concentration, and/or H2O concentration lower than that of the contaminated air 201.

Also from the scrubber-separator 202 used liquid absorbent may exit. The used liquid absorbent may flow into a heat exchanger 206. Therein, the used liquid absorbent may be heated by a regenerated liquid absorbent described below, and next flow, via a pump 221, into a heater 207 wherein the used liquid absorbent may be further heated. Alternatively, in the context of an aircraft, the used liquid absorbent may be heated by trim air.

From the heater 207, a heated, used liquid absorbent (i.e., absorbent liquid with contaminants) may be received by a second gas-liquid contactor-separator 208 (i.e., stripper) 208. The stripper 208 may have the same design as the scrubber 202, or a different design. In the context of an aircraft, the stripper 208 may also be used to discharge (i.e., not recirculate) carbon dioxide and/or water which can be transferred to the trim air.

From the stripper 208, as noted above, a regenerated or clean liquid absorbent may exit. In embodiments, a gas contaminant concentration in the regenerated liquid absorbent is lower than that of the used liquid absorbent. The regenerated liquid absorbent may flow into the heat exchanger 206 wherein the regenerated liquid absorbent may be cooled by used liquid absorbent.

Concurrent with the stripper 208 discharging or outflowing the regenerated or clean liquid absorbent, the stripper 208 may discharge or outflow contaminant(s), such as CO2, and/or H2O vapor. As will become more evident below, the stripper 208 can be configured to not only discharge contaminants, but do so in a fashion that allows contaminants to be recovered and reused.

A vacuum pump and/or compressor 217 may pump the discharged contaminant(s) from the stripper 208 and into a condenser 218. The condenser 218 can be configured to allow contaminants to be recovered and reused. Therefore, in embodiments, the condenser 218 may discharge liquid water, via a water separator 222, to a water storage 216 and/or discharge CO2 and/or water vapor to a dehumidifier 219.

The dehumidifier 219 can be configured to enable the recovery and reuse of contaminants. Thus, the dehumidifier 219 may separate incoming water vapor from CO2, and flow the CO2 to a Sabatier reactor 215. The dehumidifier 219 can also receive, via a needle valve 220, a mixture of CO2 and/or water vapor from the water separator 222, and use such mixture as a sweep gas in the dehumidifier 219. The sweep gas mixture, together with water vapor that has been separated from CO2 in the dehumidifier 219, may then exit the dehumidifier 219 and flow back to the stripper 208 as a sweep gas therein.

As can be seen, in embodiments, the CO2 and/or H2O may be recovered and reused, such as by the Sabatier reactor 215 and by the water storage 216, respectively. A Sabatier reactor functions by reacting the carbon dioxide with hydrogen to convert it to methane and water. The water, in turn, may be electrolyzed to generate hydrogen and oxygen, forming a closed-loop air revitalization system.

Figure 3:
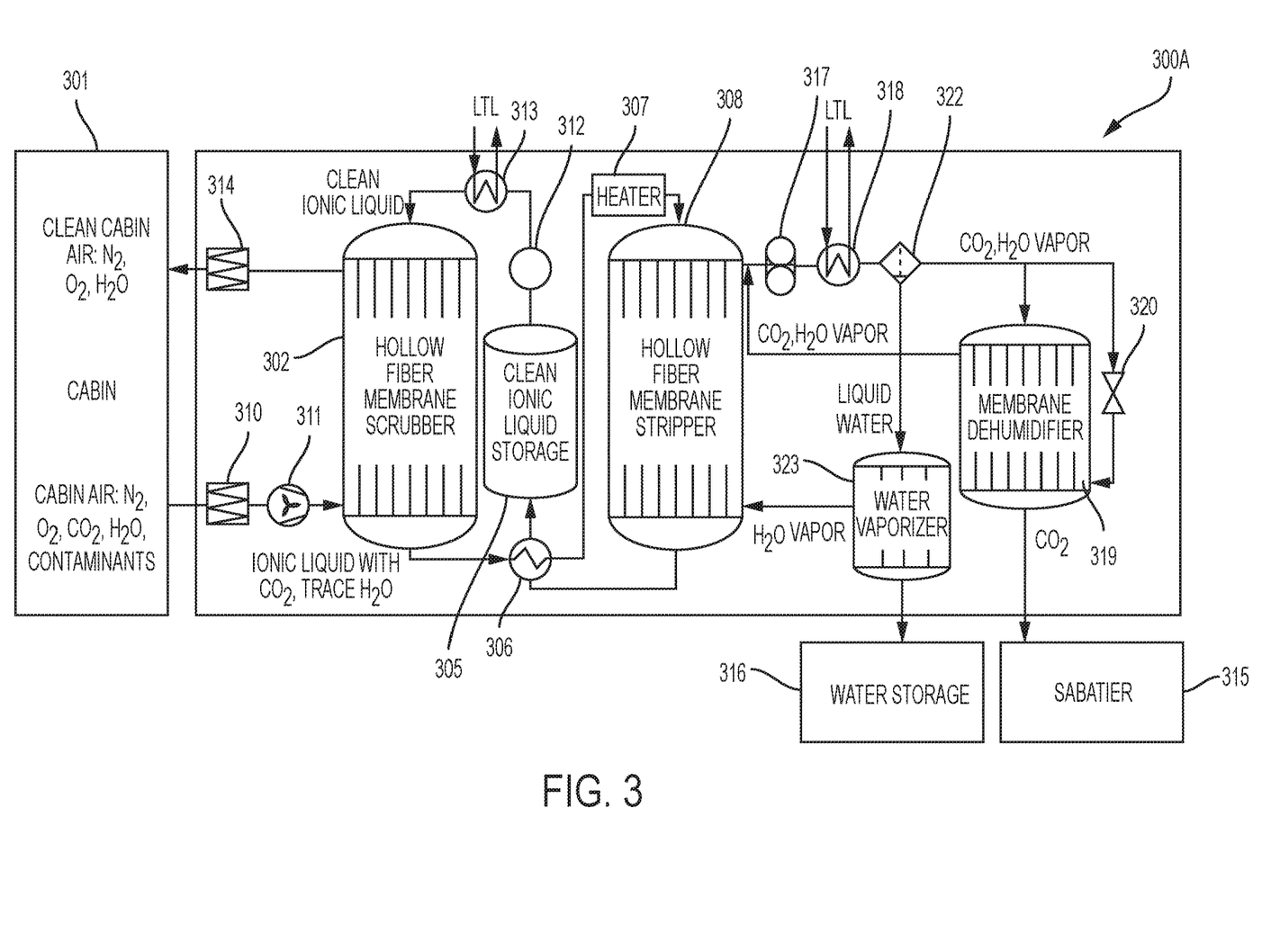
FIG. 3 is a schematic diagram of a contaminant removal subsystem according to another embodiment of the present invention.

FIG. 3 is a schematic diagram of another exemplary contaminant removal subsystem (i.e., closed-loop air revitalization subsystem) 300A that is similar to the subsystem 200A shown in FIG. 2. Accordingly, reference numbers in FIG. 3 correspond to those in FIG. 2.

However, in the embodiment of FIG. 3, a sweep gas to a stripper 308 is provided by a separate water vaporizer 323 rather than a dehumidifier. More specifically, and unlike the embodiment of FIG. 2, in the embodiment of FIG. 3, the water vaporizer 323 is intermediate a water separator 322 and a water storage 316. Accordingly, the water separator 322 can outflow liquid water to the water vaporizer 323. In turn, the water vaporizer 323 can outflow water vapor to the stripper 308 wherein the water vapor can act as a sweep gas.

In addition, in the embodiment of FIG. 3, the dehumidifier 319, upon receiving, via a needle valve 320, a mixture of CO2 and/or H2O vapor, may use such mixture therein as a sweep gas. Upon such sweep gas mixture exiting the dehumidifier 319, the sweep gas mixture may recirculate back to a point upstream of (i.e., at the suction side of) the compressor 317.

Figure 4:
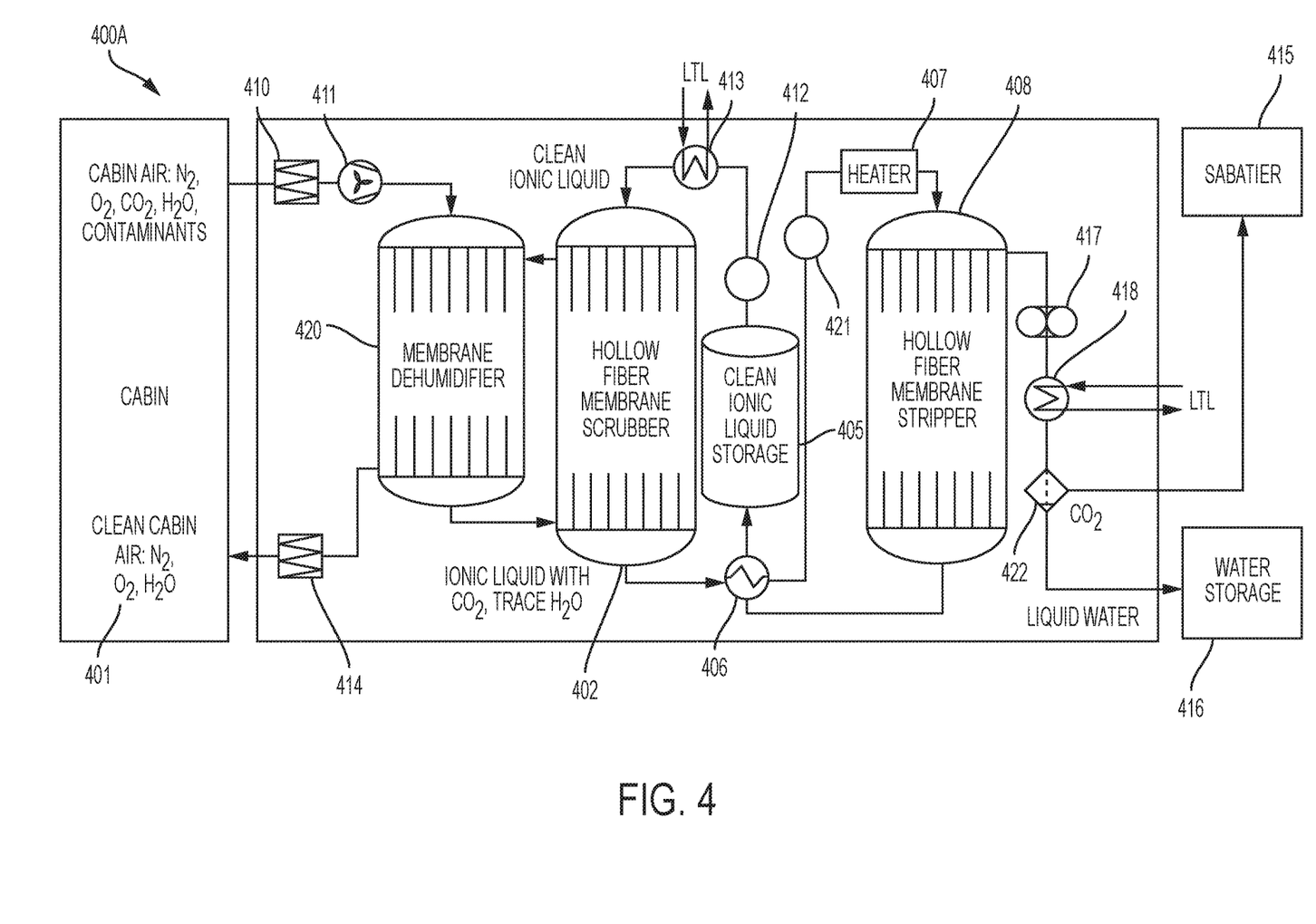
FIG. 4 is a schematic diagram of a contaminant removal subsystem according to a further embodiment of the present invention.

FIG. 4 is a schematic diagram of an additional exemplary contaminant removal subsystem (i.e., closed-loop air revitalization subsystem) 400A that is similar to the subsystem 200A shown in FIG. 2. Accordingly, reference numbers in FIG. 4 correspond to those in FIG. 2.

However, in the embodiment of FIG. 4, a dehumidifier 420 is intermediate a source of contaminated air, such as an occupant cabin, and a scrubber 402, rather than the dehumidifier being downstream of the stripper as in the embodiment of FIG. 2.

Accordingly, the dehumidifier 420 may receive contaminated air containing CO2 and humidity from the blower 411, and remove water from this air. The dehumidified air passes to the scrubber 402. In the scrubber, CO2 and more water is removed. The now very dry and purified air is returned to the dehumidifier 420 as a sweep gas. As a sweep gas, it receives the water removed from the other stream, and is rehumidified. This stream is now returned to the cabin as clean cabin air. In this embodiment, there is no sweep stream provided to the stripper 408.

Figure 5:
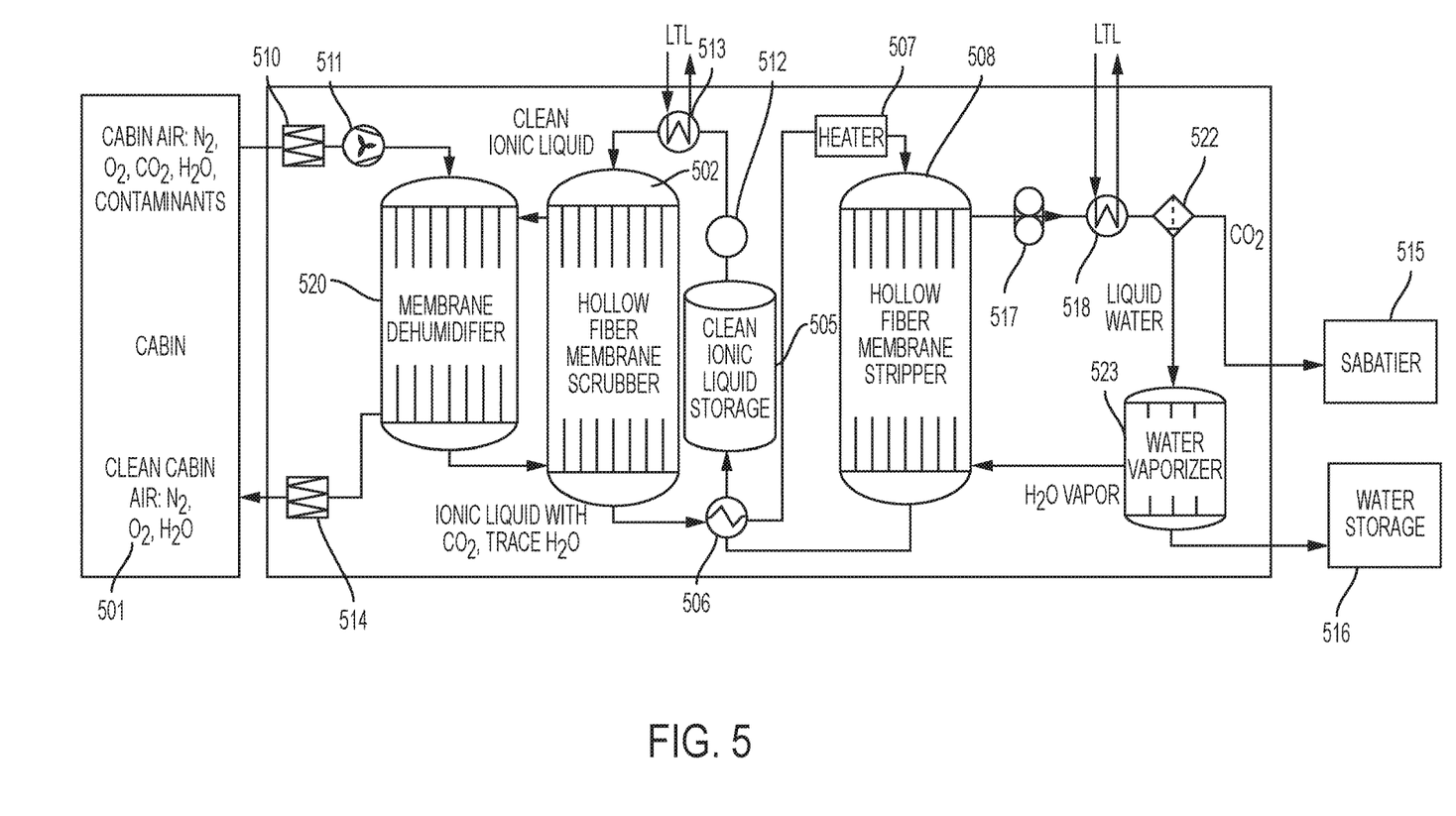
FIG. 5 is a schematic diagram of a contaminant removal subsystem according to an additional embodiment of the present invention.

FIG. 5 is a schematic diagram of a still further exemplary contaminant removal subsystem (i.e., closed-loop air revitalization subsystem) 500A that is similar to the combined subsystems 300A and 400A shown in FIGS. 3-4. Accordingly, reference numbers in FIG. 5 correspond to those in FIGS. 3-4.

In the embodiment of FIG. 5, like the embodiment in FIG. 3, a sweep gas to a stripper 508 is provided by a separate water vaporizer 523 rather than a dehumidifier. In the embodiment of FIG. 5, the water vaporizer 523 is intermediate a water separator 522 and a water storage 516. Accordingly, the water separator 522 can outflow liquid water to the water vaporizer 523. In turn, the water vaporizer 523 can outflow water vapor to the stripper 508 wherein the water vapor can act as a sweep gas.

Also, in the embodiment of FIG. 5, like the embodiment in FIG. 4, a dehumidifier 520 is intermediate a source of contaminated air, such as an occupant cabin, and a scrubber 502, rather than the dehumidifier being downstream of the stripper as in the embodiment of FIG. 2.

Accordingly, the dehumidifier 520 may receive contaminated air containing CO2 and humidity from the blower 511, and remove water from this air. The dehumidified air passes to the scrubber 502. In the scrubber, CO2 and more water is removed. The now very dry and purified air is returned to the dehumidifier 520 as a sweep gas. As a sweep gas, it receives the water removed from the other stream, and is rehumidified. This stream is now returned to the cabin as clean cabin air. In this embodiment, a sweep stream, in the form of H2O vapor from a water vaporizer 523, is provided to the stripper 508.

Figure 6A:
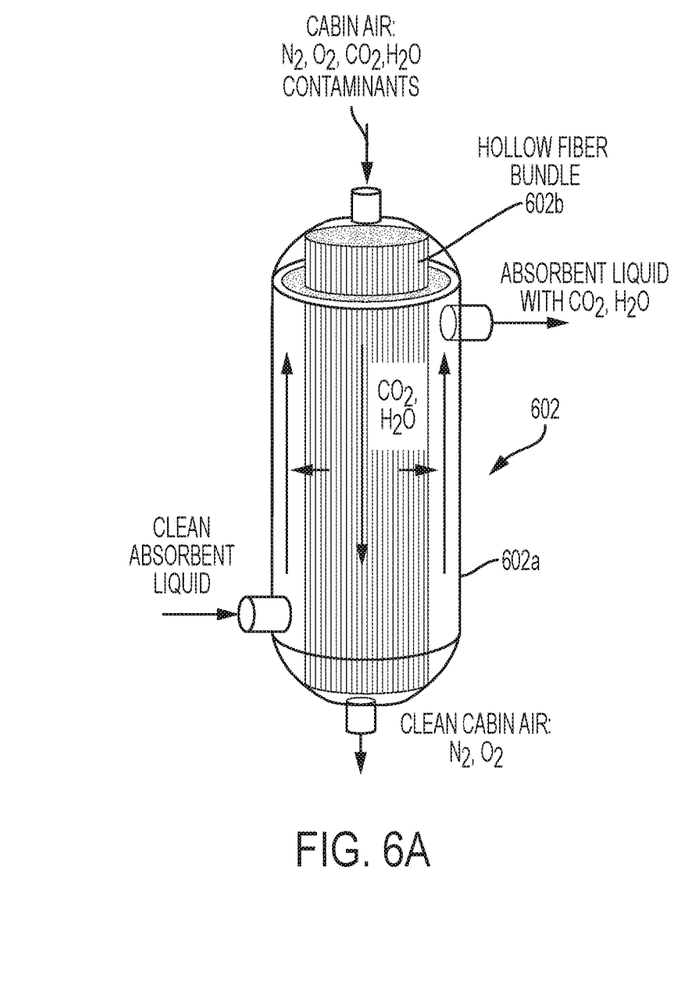
FIGS. 6A-6B are side views of a scrubber according to an embodiment of the present invention.
Figure 6B:
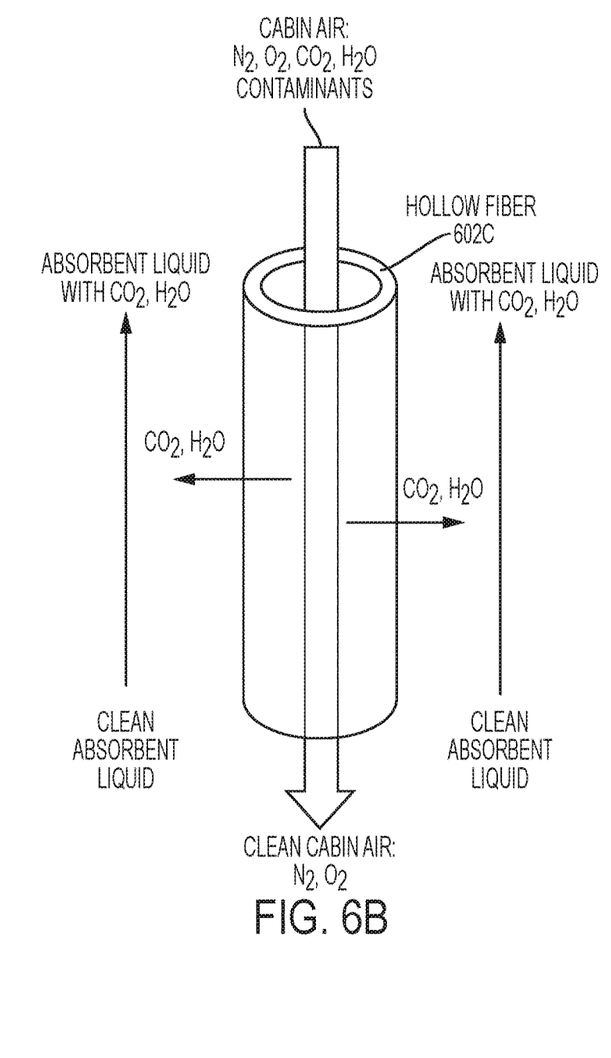

FIGS. 6A-6B depict an exemplary embodiment of a scrubber 602 that may be employed in the contaminant removal subsystem 200, for example. In FIG. 6A, the scrubber 602 may include a cylindrical housing 602a that encloses a hollow fiber bundle 602b. Contaminated air may enter the housing 602a at one end thereof and clean air may exit at an opposite end thereof. Regenerated or clean absorbent liquid may enter the housing 602a at one side thereof, and used liquid absorbent with contaminants may exit the housing 602a at an opposite side thereof. In this embodiment, regenerated or clean absorbent liquid flows counter (i.e., opposite) to the contaminated air flow. Moreover, the counter flow causes contaminants to flow radially outward from the hollow fiber bundle 602b.

FIG. 6B depicts the same flows as in FIG. 6A, but in the context of a single hollow fiber 602c that can be part of the hollow fiber bundle 602b.

Figure 7A:
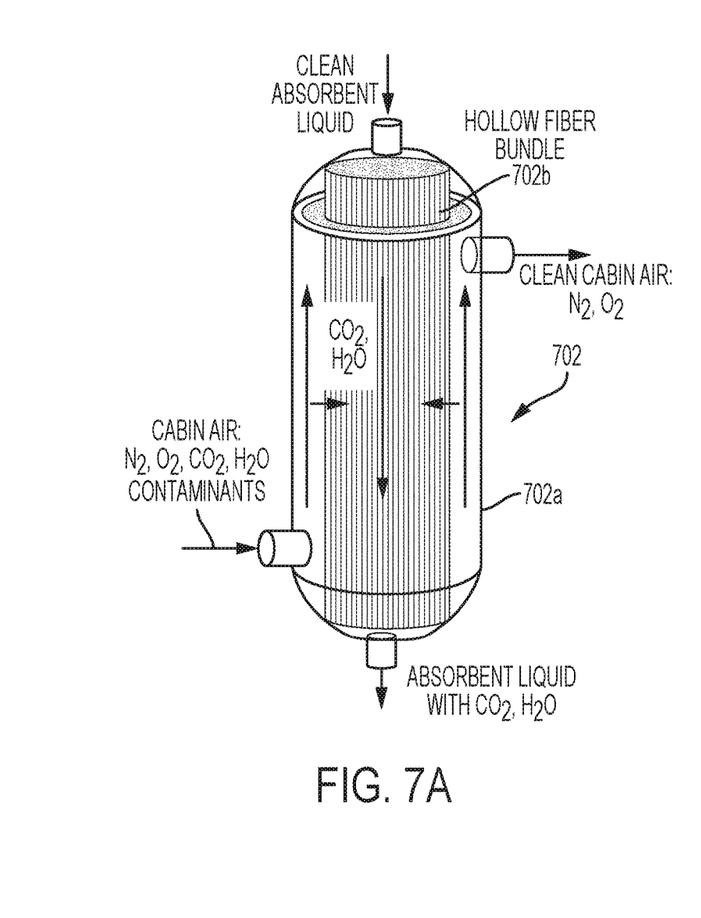
FIGS. 7A-7B are side views of a scrubber according to another embodiment of the present invention.
Figure 7B:
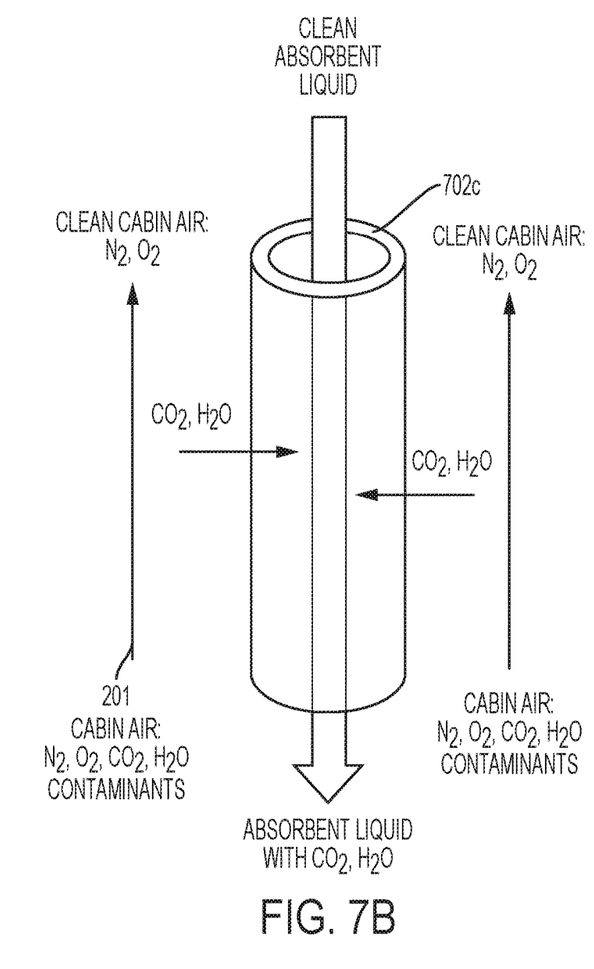

FIGS. 7A-7B depict another exemplary embodiment of a scrubber 702 that may be employed in the contaminant removal subsystem 200, for example. As in FIG. 6A, in FIG. 7A, the scrubber 702 may include a cylindrical housing 702a that encloses a hollow fiber bundle 702b. However, contaminated air may enter the housing 702a at one side thereof and clean air may exit at an opposite side thereof. Regenerated or clean absorbent liquid may enter the housing 702a at one end thereof, and used liquid absorbent with contaminants may exit the housing 702a at an opposite end thereof. As in FIG. 6A, in this embodiment, clean absorbent liquid flows counter (i.e., opposite) to the contaminated air flow. However, the counter flow causes contaminants to flow radially inward towards the hollow fiber bundle 702b.

FIG. 7B depicts the same flows as in FIG. 7A, but in the context of a single hollow fiber 702c that can be part of the hollow fiber bundle 702b.

Figure 8A:
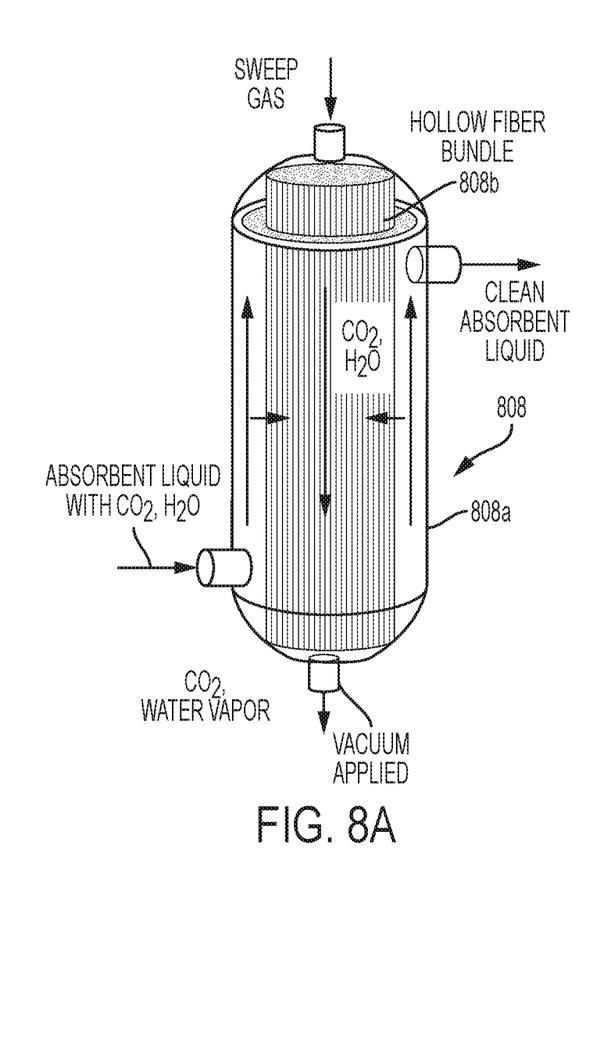
FIGS. 8A-8B are side views of a stripper according to an embodiment of the present invention.
Figure 8B:
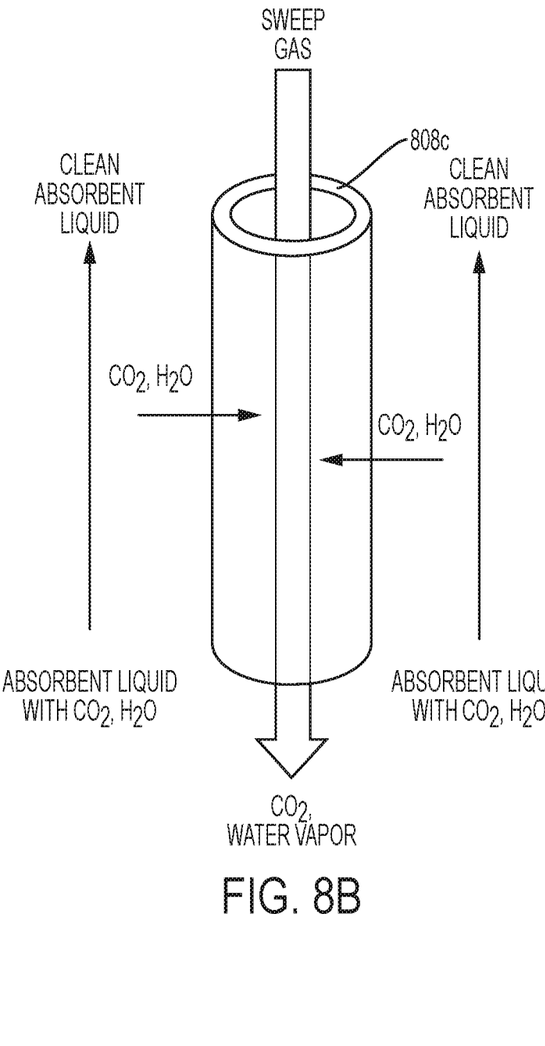

FIGS. 8A-8B depict an exemplary embodiment of a stripper 808 that may be employed in the contaminant removal subsystem 200, for example. In FIG. 8A, the stripper 808 may include a cylindrical housing 802a that encloses a hollow fiber bundle 802b. Sweep gas may enter the housing 802a at one end thereof and contaminants may exit at an opposite end thereof. Used absorbent liquid with contaminants may enter the housing 802a at one side thereof, and regenerated or clean absorbent liquid may exit the housing 802a at an opposite side thereof. In this embodiment, used absorbent liquid with contaminants flows counter (i.e., opposite) to the sweep gas flow. Moreover, the counter flow causes contaminants to flow radially inward towards the hollow fiber bundle 802b.

FIG. 8B depicts the same flows as in FIG. 8A, but in the context of a single hollow fiber 802c that can be part of the hollow fiber bundle 802b.

Figure 9A:
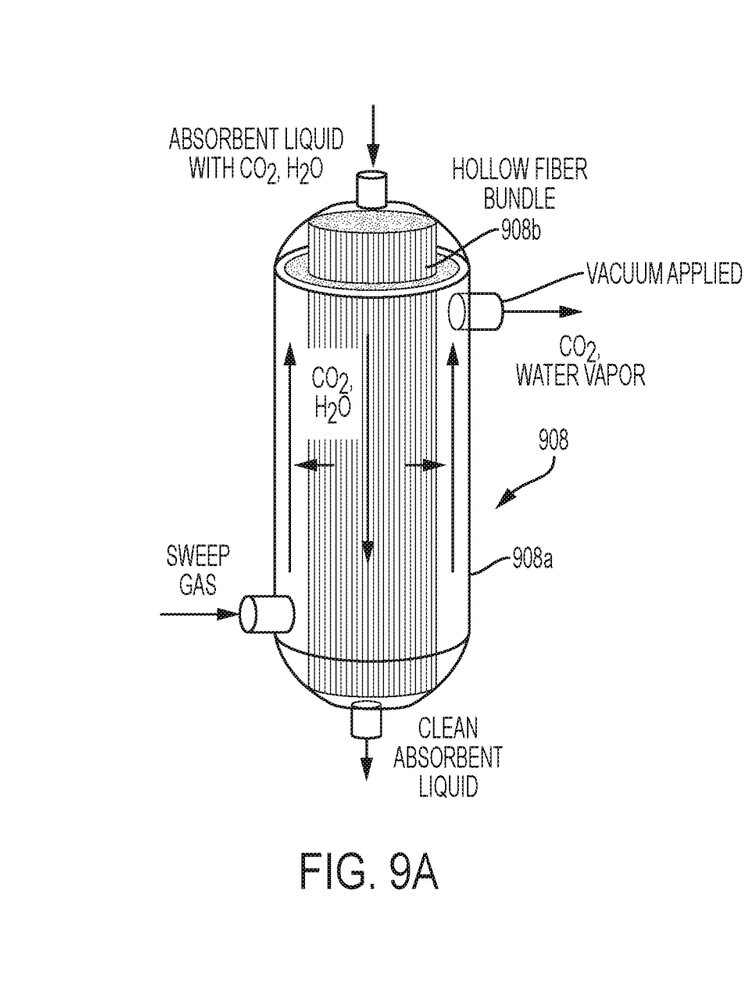
FIGS. 9A-9B are side views of a stripper according to another embodiment of the present invention.
Figure 9B:
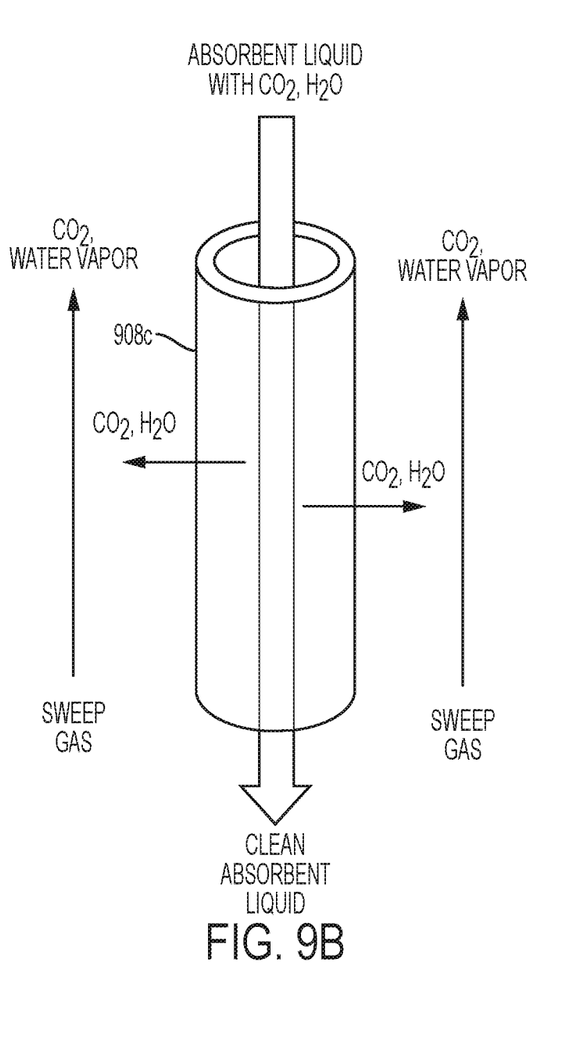

FIGS. 9A-9B depict another exemplary embodiment of a stripper 908 that may be employed in the contaminant removal subsystem 200, for example. As in FIG. 8A, in FIG. 9A, the stripper 908 may include a cylindrical housing 902a that encloses a hollow fiber bundle 902b. However, sweep gas may enter the housing 902a at one side thereof and contaminants may exit at an opposite side thereof. Used absorbent liquid with contaminants may enter the housing 902a at one end thereof, and regenerated or clean absorbent liquid may exit the housing 902a at an opposite end thereof. As in FIG. 8A, in this embodiment, sweep gas flows counter (i.e., opposite) to the used absorbent liquid with contaminants flow. However, the counter flow causes contaminants to flow radially outward from the hollow fiber bundle 902b.

FIG. 9B depicts the same flows as in FIG. 9A, but in the context of a single hollow fiber 902c that can be part of the hollow fiber bundle 902b.

Figure 10:
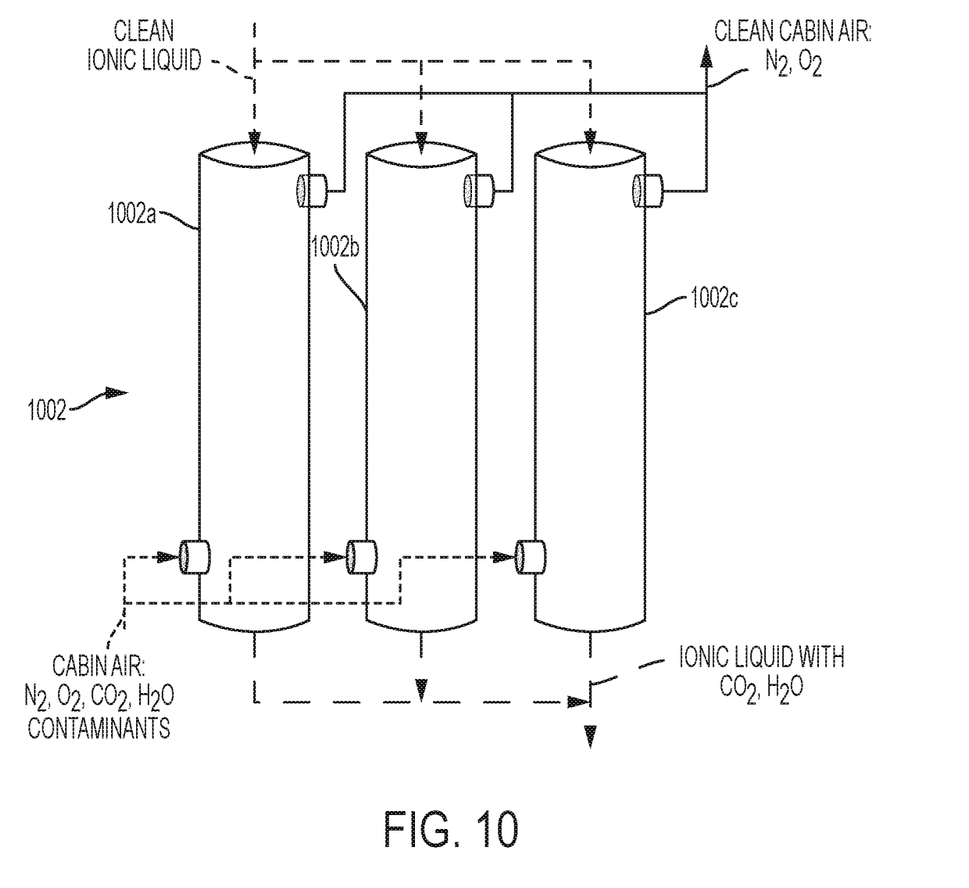
FIG. 10 is a schematic view of a scrubber according to yet another embodiment of the present invention.

FIG. 10 depicts yet another exemplary embodiment of a scrubber 1002 that may be employed in the contaminant removal subsystem 200, for example. As a further example, the scrubber 1002 may be employed as the scrubber 202 and/or 302. In FIG. 10, the scrubber 1002 may include a plurality of parallel housings 1002a, b, c that enclose respective hollow fiber bundles (not shown) that can be similar to those in FIGS. 6A-6B or FIGS. 7A-7B.

Although FIGS. 6-10 describe a hollow fiber and/or bundle in the context of a stripper and/or scrubber, it should be understood that the same may be employed in the context of a dehumidifier, such as that described in C. Iacomini, J. Hecht, J. Harrell, J. Lumpkin "Qualification of the Boeing Starliner Humidity Control Subassembly", 46th International Conference on Environmental Systems, 10-14 Jul. 2016, Vienna, Austria, ICES-2016-322, which is incorporated herein by reference.

According to the present invention, the liquid absorbent can meet a demanding set of criteria. The liquid can be safe and nontoxic to humans, and may not contaminate the purified air with odors or organic vapors. It may absorb carbon dioxide at the partial pressure expected during the mission, and may not lose performance when simultaneously absorbing water. It may also be regenerable without the use of space vacuum, so as not to lose CO2 and water to space, and regenerable without using excessive temperatures or power. The liquid may be durable and last without deterioration for the life of the mission.

The liquid absorbent can be one or more ionic liquids. They are salts, generally comprised of an anion and organic cation, which are liquid at their temperature of use. Because they are salts, they have effectively zero vapor pressure, thus eliminating odors and reducing the likelihood of contaminating the purified air. They are generally nontoxic and have sufficient stability to resist deterioration. Ionic liquids generally contain relatively large organic cations (quaternary ammonium or phosphonium compounds) and any of a variety of anions, both of which can be tailored to obtain desired characteristics. Ionic liquids can both physically dissolve carbon dioxide and have specific chemical interactions with it. As a class, almost every ionic liquid is water soluble and hygroscopic, meaning that they will absorb moisture from the air, but due to their negligible volatility, the water can be removed by evaporation either by elevating the temperature or reducing the water partial pressure. Because a very large number of ionic liquids exist, and both the cation and the anion can be tailored to obtain desired characteristics, this class of compounds has flexibility as the liquid absorbent for a carbon dioxide removal system with ability to remove contaminants.

Ionic liquids suitable for use in this invention comprise those with melting points below 20° C., low vapor pressure, and with capacity for carbon dioxide, at 30 deg. C. and in the presence of 3.8 torr carbon dioxide partial pressure, of >0.3%. Examples of such ionic liquids include 1-ethyl-3-methylimidazolium acetate, 1-ethyl-3-methylimidazolium trifluoracetate, 1-butyl-3-methylimidazolium acetate, tributylmethylphosphonium acetate, triethylmethylphosphonium acetate etc. These ionic liquids are hygroscopic and can absorb water as well and carbon dioxide. Therefore, the effective working fluid can, in many cases, comprise a mixture of the ionic liquids specified and water. It may, under some circumstances, be useful to add water to the ionic liquid before contacting with carbon dioxide. This can reduce the carbon dioxide capacity but also reduce the viscosity.

1-butyl-3-methylimidazolium acetate (BMIM Ac) has a high CO2 capacity and well understood physical properties. BMIM Ac satisfies the basic requirements for an absorbent in a manned vehicle. It is not a hazardous substance or mixture, and has no hazards not otherwise classified. The pH of an aqueous solution is 6.1, and the autoignition temperature is 435° C. The compound is a clear, somewhat viscous liquid, and can be handled readily. The surface tension is similar to that for a polar organic solvent, and the density is similar to that for water. The onset for thermal degradation sets the upper temperature limit for processing, and is comfortably higher than the temperature needed for desorption. The viscosity for this ionic liquid is higher than that of water, but can be reduced either by raising the temperature or water content. In normal use, the ionic liquid absorbs both CO2 and water, and therefore the viscosity values vary in the presence of water. Viscosity plays a role in determining mass transfer rates for CO2 adsorption and desorption. Control of viscosity can therefore reduce the weight and volume of the contactor-separator.

EXAMPLES

For mass transfer in membrane systems, we should consider transport in the gas phase, transport through the membrane, and liquid-phase mass transport. Gas-phase transport will be fast relative to the other processes, and it is possible to minimize the resistance to mass transfer through the membrane by proper material and morphology choices, leaving liquid phase mass transfer as the rate-determining process. To prevent the membrane from significantly slowing mass transfer, a non-wetting membrane material should be chosen, since liquid-filled pores create stagnant zones that inhibit liquid flow. For liquid-phase mass transfer, the mass transfer coefficient is expected to be strongly dependent on the diffusion coefficient, and this, in turn, depends primarily on the ionic liquid viscosity. The ratio between the mass transfer coefficient and the diffusion coefficient is determined by the Sherwood number. The Lévêque-Graetz and Kartohardjono approaches to estimating this number include dependencies on the velocity of flow through the fiber, liquid viscosity and the diffusion coefficient for CO2 in the liquid.

$$Sh = \sqrt[3]{3.67^3 + 1.62^3 \frac{vd^2}{DZ}}$$

$$Sh = 0.1789 \varphi^{0.86} \left(\frac{\rho v d}{\eta}\right)^{0.34} \left(\frac{\eta}{\rho D}\right)^{\frac{1}{3}}$$

Avoiding wetting the membrane pores not only improves mass transfer but also prevents leakage of ionic liquid into gas lines. Such leakage would necessitate subsequent separation. The ability of the liquid to penetrate pores depends on the surface tension, the viscosity, the dimension of the pores and the contact angle. Because ionic liquids are polar and BMIM Ac has a surface tension of 36.4 mN m−1, these considerations guide us to investigate relatively hydrophobic membrane materials with low critical surface tensions, such as polytetrafluoroethylene (PTFE). We measured the contact angle for BMIM Ac on a porous PTFE surface to be 81.3, showing that it will not wet this material unless significant force is applied. Kreulen H, Kreulen, C. A. Smolders, G. F. Versteeg, W. P. M. van Swaaij "Microporous hollow fiber membrane modules as gas liquid contactors. Part 1. Physical mass transfer processes, A specific example: Mass transfer in highly viscous liquids" J. Membrane Sci., vol. 78, 1993, 197-216 and Z. Dai, L. Ansaloni, L. Deng "Precombustion CO2 capture in polymeric hollow fiber membrane contactors using ionic liquids: Porous membrane versus nonporous composite membrane" Ind. Eng. Chem., Res. Vol. 55, 2016, 5983-5992 each describe the addition of a composite layer to prevent pore-filling with very little effect on mass transfer.

Initial experimental results using a membrane contactor were obtained using a laboratory test stand. A hollow fiber microfiltration module was used for the contactor, with 90:10 BMIM Ac: water as the liquid phase, and air containing 1-4 torr partial pressure of CO2 at atmospheric pressure as the vapor phase. The pressures of both the liquid and the gas phases were controlled at up to 6 psi in operation. The ionic liquid may either be directed through the lumina of the hollow fibers or through the shell surrounding them, and we evaluated both options. When the ionic liquid passes through the lumina, the pressure drop is higher because of the viscosity of the ionic liquid, and there is less opportunity for bypass due to the small diameter of these fibers. In fact, we observed little difference between results from these two configurations. Equation (8) defines the mass transfer coefficient as the ratio of the molar flux to driving force (either concentration difference or partial pressure difference), and has been used to estimate the membrane area required for a CO2 load of 4.15 kg day-1, representing a likely load from four crew members in a deep space vessel.

$$k = \frac{n_{CO2}}{A \Delta c_{CO2}} = \frac{n_{CO2} RT}{A \Delta p_{CO2}}$$

CO2 diffusivity in the ionic liquid is expected to be a main parameter that defines the overall mass transfer and the process efficiency. The diffusivity of CO2 in air is very high in comparison with diffusion in the ionic liquid, so the main resistance to CO2 mass transfer is in the liquid phase. Addition of small amounts of water into the liquid decrease the viscosity and increase the diffusivity. We have shown that the water content in ionic liquid negatively affects the absorption capacity. However, the effect of water dilution on capacity is expected to be smaller than the positive effect of water dilution on liquid phase mass transfer rate via viscosity reduction, and by increasing the air-liquid surface area. In other words, the dilution of the ionic liquids with water that is inevitable because of the affinity of the ionic liquids for water is expected to increase the mass transfer rate (decrease scrubber size) without greatly decreasing the ionic liquid capacity (i.e. increasing the flow rate of ionic liquid).

Similarly, we have shown that this process relies on exposing a large surface area of ionic liquid to the air stream. In addition to mass transfer, heat transfer will also occur. Note that the ionic liquid entering the scrubber is cooled. This is beneficial because it increases the working CO2 loading capacity, but will also have the effect of cooling the air returning to the cabin. Again, by taking advantage of this process, the load on cooling systems elsewhere in the spacecraft is reduced, resulting in weight and power reductions for these systems.

It is estimated that this system will be a low-maintenance, high-reliability system since the ionic liquid system will not have corrosion problems.

In addition to reducing the launch costs associated with the use of the ionic liquid system, the new system would also reduce the mass of consumables. The direct liquid contact system would not vent to space and would not have a connection to space vacuum. The use of the open-loop CO2 removal systems typically used in short-duration missions has also been considered for long-duration missions due to their simplicity and low size, weight and power. However, these devices would require an even greater launch cost due to consumables. Anderson, M. A., Ewert, M. K., Keener, J. F., Wagner, S. A., Stambaugh, I. C. NASA Report TP-2015-21870, Johnson Space Center, March, 2015 estimated that the use of an open-loop system would require a total of 21 kg/crewmember/day of potable water, oxygen, and the tanks to store them, or a total of about 75,600 kg for a 30 month mission to Mars with 4 crewmembers.

The combination of direct liquid contact and novel ionic liquids can provide an integrated carbon dioxide, humidity and trace contaminant removal system with a significantly lower size, weight and power compared to current systems. This system gains its advantage from the use of ionic liquid as the liquid absorbent. Liquid systems eliminate the mass transfer limitations and plumbing complexities of alternative solid adsorbents, and avoid contamination of the cabin air by the sorbent through the use of ionic liquids, which have zero vapor pressure. In addition to being containable, ionic liquids are flame retardant, non-toxic, and very stable. This sorbent is completely regenerable, without the use of space vacuum or high temperatures, and thus provides NASA with an excellent option for closed-loop CO2 removal on existing and future vehicles.

It should be understood, of course, that the foregoing relates to exemplary embodiments of the invention and that modifications may be made without departing from the spirit and scope of the invention as set forth in the following claims.

We claim:

1. An environmental control system, comprising:
an air conditioning subsystem;
a contaminant removal subsystem downstream of the environment to be conditioned;
wherein the contaminant removal subsystem includes:
a first gas-liquid contactor-separator;
a second gas-liquid contactor-separator; and
a dehumidifier disposed downstream of the second gas-liquid contactor-separator to produce a sweep gas to the second-gas liquid contactor-separator.

2. The contaminant removal subsystem of claim 1, further comprising a condenser downstream of the second gas-liquid contactor separator.

3. The system of claim 1, wherein the first and second gas-liquid contactor-separators comprise a hollow fiber membrane bundle.

4. The contaminant removal subsystem of claim 1, further comprising a vacuum pump downstream of the second gas-liquid contactor-separator.

5. A contaminant removal subsystem, comprising:
a first gas-liquid contactor-separator;
a second gas-liquid contactor-separator downstream of the first gas-liquid contactor-separator; and
a dehumidifier disposed downstream of the second gas-liquid contactor-separator to produce a sweep gas to the second-gas liquid contactor-separator and to recover contaminants for reuse.

6. The subsystem of claim 5, further comprising a condenser downstream of the second gas-liquid contactor-separator.

7. The subsystem of claim 5, further comprising a compressor downstream of the second gas-liquid contactor-separator.

8. The subsystem of claim 5, further comprising a water vaporizer downstream of the second gas-liquid contactor-separator.

9. The subsystem of claim 5, wherein the liquid in the first gas-liquid contactor-separator is an ionic liquid.

10. The subsystem of claim 5, wherein the first and the second gas-liquid contactor-separators comprise hollow fiber membrane bundles.

11. A contaminant removal subsystem, comprising:
a first gas-liquid contactor-separator;
a second gas-liquid contactor-separator downstream of the first gas-liquid contactor-separator;
a dehumidifier or downstream of the second gas-liquid contactor-separator to produce a sweep gas to the second gas-liquid contactor-separator; and
a condenser downstream of the second gas-liquid contactor-separator;
wherein the condenser is configured to:
discharge liquid water for recovery and reuse;
discharge a contaminant for recovery and reuse.

12. The subsystem of claim 10, further comprising a vacuum pump downstream of the second gas-liquid contactor-separator.

13. The subsystem of claim 10, wherein the condenser is further configured to discharge contaminants that include CO2.

14. The subsystem of claim 10, wherein the condenser is further configured to discharge contaminants that include water.

15. The subsystem of claim 10, further comprising a water extractor downstream of the condenser.

16. The subsystem of claim 10, wherein the discharged contaminant is CO2.

* * * * *